(12) United States Patent
Hori et al.

(10) Patent No.: US 6,740,366 B2
(45) Date of Patent: May 25, 2004

(54) ARTICLE HAVING PREDETERMINED SURFACE SHAPE AND METHOD FOR PREPARING THE SAME

(75) Inventors: Masahiro Hori, Osaka (JP); Koichiro Nakamura, Osaka (JP); Mitsuhiro Kawadu, Osaka (JP); Hiroko Shikata, Osaka (JP); Hiroaki Yamamoto, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/204,324

(22) PCT Filed: Dec. 19, 2001

(86) PCT No.: PCT/JP01/11146

§ 371 (c)(1),
(2), (4) Date: Aug. 21, 2002

(87) PCT Pub. No.: WO02/053345

PCT Pub. Date: Jul. 11, 2002

(65) Prior Publication Data

US 2003/0027967 A1 Feb. 6, 2003

(30) Foreign Application Priority Data

Dec. 22, 2000 (JP) ........................................ 2000-390588
Mar. 5, 2001 (JP) ........................................ 2001-059480
Jul. 9, 2001 (JP) ........................................ 2001-207718

(51) Int. Cl.[7] .................................................. C08J 7/04
(52) U.S. Cl. ........................ 427/515; 427/387; 428/156; 428/429; 428/447; 428/450; 428/426; 428/448; 264/299
(58) Field of Search ................................. 427/515, 387; 428/156, 429, 447, 450, 426, 448; 264/299

(56) References Cited

U.S. PATENT DOCUMENTS 4,252,421 A * 2/1981 Foley, Jr.
4,576,850 A * 3/1986 Martens
4,777,233 A 10/1988 Suzuki et al.
5,543,942 A * 8/1996 Mizuguchi et al.

FOREIGN PATENT DOCUMENTS

| EP | 1014113 | 6/2000 |
| JP | 62-102445 | 5/1987 |
| JP | 63-49702 | 3/1988 |
| JP | 6-240030 | 8/1994 |
| JP | 6-242303 | 9/1994 |
| JP | 7-32381 | 2/1995 |
| JP | 2001-106710 | 4/2001 |

OTHER PUBLICATIONS

Freeman, "Silicones", Published for the Plastics Institute, 1962, pp. 46–52 and 67.*

* cited by examiner

Primary Examiner—Kuo-Liang Peng
(74) Attorney, Agent, or Firm—Wenderoth, Lind & Ponack, L.L.P.

(57) ABSTRACT

An article having a predetermined surface configuration, such as an optical element having fine irregularities in the surface which has high heat resistance, small heat shrinkage at the time of molding a film and high dimensional stability, and a production process therefor. The article having a predetermined surface configuration is produced by setting a composition comprising a compound which contains a dimethylsiloxane skeleton having at least three recurring units and at least one polymerizable organic group in the molecule between and in contact with the surface of a substrate and the molding surface of a mold in the form of a film, applying at least one of heat and ultraviolet radiation to the composition, removing the mold, and heating as required to form a film having a surface configuration which is the inversion of the surface configuration of the mold on the surface of the substrate.

10 Claims, No Drawings

ARTICLE HAVING PREDETERMINED SURFACE SHAPE AND METHOD FOR PREPARING THE SAME

FIELD OF THE INVENTION

The present invention relates to an article having a predetermined surface configuration and to a production process therefor. More specifically, it relates to an article having a predetermined surface configuration typified by optical elements such as reflection type diffraction gratings, transmission type diffraction gratings, lens arrays and Fresnel lenses and to a production process therefor.

DESCRIPTION OF THE PRIOR ART

Optical elements such as diffraction gratings and microlens arrays must have predetermined fine irregularities in the surface.

As means of forming such irregularities in the surface, there is known a method in which an ultraviolet curable resin monomer is uniformly spread over a substrate and exposed to ultraviolet radiation while it is contacted to a mold having irregularities (JP-A 63-49702) (the term "JP-A" as used herein means an "unexamined published Japanese patent application").

Also JP-A 62-102445 and JP-A 6-242303 disclose a production process in which irregularities are formed in the surface of a substrate by applying a solution containing silicon alkoxide to a glass substrate, pressing a mold having irregularities against the coating film and heating.

However, in the technology of the above JP-A 63-49702, the ultraviolet curable monomer has large shrinkage in the photopolymerization step and therefore may not achieve high accuracy required for an optical element. The monomer also has a problem with heat resistance.

In contrast to this, an optical element obtained by thermally curing silicon alkoxide has excellent heat resistance but it has large shrinkage in the hydrolysis/polycondensation reaction step and therefore may not achieve high accuracy required for an optical element.

SUMMARY OF THE INVENTION

It is an object of the present invention to provide an article having a predetermined surface configuration, such as an optical element having fine irregularities in the surface, which has high heat resistance, small thermal shrinkage at the time of molding a film and high dimensional accuracy, by solving the above problems existent in the prior art.

It is another object of the present invention to provide an industrially advantageous process for producing the above article of the present invention.

Other objects and advantages of the present invention will become apparent from the following description.

According to the present invention, firstly, the above objects and advantages of the present invention are attained by a process for producing an article having a predetermined surface configuration, comprising the steps of:

setting a composition comprising a compound which contains a dimethylsiloxane skeleton having at least three recurring units and at least one polymerizable organic group in the molecule between and in contact with the surface of a substrate and the molding surface of a mold in the form of a film;

applying at least one of heat and ultraviolet radiation to the composition set in the form of a film;

removing the mold and, as required, heating the film; and forming the article in which the surface of the substrate is covered with a film having a surface configuration which is the inversion of the surface configuration of the mold.

According to the present invention, secondly, the above objects and advantages of the present invention are attained by an article having a predetermined surface configuration, comprising a substrate and an organopolysiloxane film having a predetermined uneven surface and a maximum thickness of 1 $\mu$m to 1 mm formed on the surface of the substrate, wherein the organopolysiloxane film contains 10 to 50 wt % of a methyl group, 1 to 30 wt % of a polymerized segment of a polymerizable organic group and 45 to 89 wt % of a Si—O bonding segment, the total of the methyl group and the polymerized segment of the polymerizable organic group being 11 to 55 wt %.

DETAILED DESCRIPTION OF THE PREFERRED EMBODIMENT

The present invention will be described in detail hereinunder. A description is first given of the production process of the present invention.

The composition used in the process of the present invention comprises a compound having linear and branched dimethylsiloxane skeletons having three or more recurring units. The dimethylsiloxane skeletons contribute to the heat resistance and low shrinkage of the obtained film. When the number of recurring units represented by—((CH$_3$)$_2$Si—O)— is too small, the viscosity of a liquid composition becomes too low and when the number of the recurring units is too large, the viscosity of the liquid composition becomes too high. In any case, coating and other works and handling become difficult. The number of the recurring units is preferably 3 to 200, more preferably 3 to 100, the most preferably 3 to 50. The compound also has at least one polymerizable organic group in the molecule. Photopolymerization (or thermopolymerization) is caused by the addition polymerization of a radical or cation formed by the optical (or thermal) decomposition of an initiator to the polymerizable organic group. Therefore, shrinkage is smaller than in a dehydration condensation reaction and a chemically bonded uniform organic-inorganic composite film can be formed instantaneously. Consequently, an organic group which is polymerized by light or heat is used as the polymerizable organic group. Examples of the photopolymerizable organic group include acryloxy group, methacryloxy group, vinyl group, epoxy group and organic groups containing these. Examples of the thermopolymerizable organic group include vinyl group, epoxy group and organic groups containing these. At least two of these groups are preferably contained in the molecule of the above compound when the polymerizable organic group is an acryloxy group, methacryloxy group or vinyl group. Organic groups containing an acryloxy group include acryloxy group-substituted alkyl groups such as acryloxypropyl group and acryloxy group-substituted hydroxyalkyl groups. Organic groups containing a methacryloxy group include methacryloxy group-substituted alkyl groups, methacryloxyethoxy group and methacryloxypolyethylene group. Organic groups containing a vinyl group include vinylbenzyloxy group, N-vinylformamide group and vinyloxy group. Organic groups containing an epoxy group include epoxy group-substituted propoxy groups, epoxycyclohexylethyl group and epoxyethylphenyl group. Since heat resistance and humidity resistance lower when too many polymerizable organic groups are contained in the molecule, the number of polymerizable organic groups in the molecule is preferably 50 or less.

The above compound is, for example, a dimethylpolysiloxane having a polymerizable organic group at both terminals represented by the following formula (1):

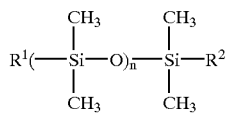

(1)

wherein $R^1$ and $R^2$ are each independently a vinyl group or a group having an acryloxy group, methacryloxy group or epoxy group, and n is an integer of 3 to 200, or a dimethylpolysiloxane having a trimethylsilyl group at both terminals and two or more polymerizable organic groups represented by the following formula (2):

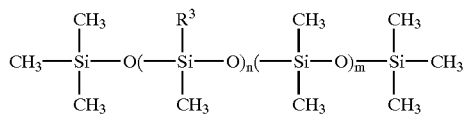

(2)

wherein $R^3$ is a vinyl group or a group having an acryloxy group, methacryloxy group or epoxy group, m is an integer of 2 to 200, n is an integer of 1 to 50 when $R^3$ is an epoxy group and an integer of 2 to 50 when $R^3$ is another group, with the proviso that m+n is 3 to 200.

Illustrative examples of the compound include (acryloxypropyl)methylsiloxane-dimethylsiloxane copolymer, (methacryloxypropyl)methylsiloxane-dimethylsiloxane copolymer, vinylmethylsiloxane-dimethylsiloxane copolymer and (epoxycyclohexylethyl)methylsiloxane-dimethylsiloxane copolymer.

Out of these compounds, a polydimethylpolysiloxane having a linear acryloxypropyl group at both terminals (the number of recurring units represented by (—((CH$_3$)$_2$Si—O)— is 3 to 50) and a polydimethylpolysiloxane having a linear methacryloxypropyl group at both terminals (the number of recurring units represented by (—((CH$_3$)$_2$Si—O)— is 3 to 50) are preferred. Out of these, a polydimethylpolysiloxane having a linear acryloxypropyl group at both terminals (the number of the recurring units of this is 10 to 25) and a polydimethylpolysiloxane having a linear methacryloxypropyl group at both terminals (the number of the recurring units of this is 10 to 25) are more preferred. When adhesion between the film and a quartz substrate must be further improved, an epoxysiloxane is preferred and a branched epoxysiloxane is particularly preferred.

The above liquid composition used in the present invention comprises a photopolymerization initiator when the polymerizable organic group of the compound is photopolymerizable. Examples of the radical photopolymerization initiator include [2-hydroxy-2-methyl-1-phenylpropan-1-one], [1-(4-isopropylphenyl)-2-hydroxy-2-methylpropane-1-one], [4-(2-hydroxyethoxy)phenyl-2-(hydroxy-2-propyl ketone)], [2,2-dimethoxy-1,2-diphenylethane-1-one], [1-hydroxy-cyclohexyl-phenyl-ketone], [2-methyl-1 [4-(methylthio)phenyl]-2-morpholinopropane-1-one], [bis(2,6-dimethoxybenzoyl)-2,4,4-trimethyl-pentylphosphine oxide] and [2-benzyl-2-dimethylamino-1-1-(4-morpholinophenyl)-butanone-1]. Examples of the cationic photopolymerization initiator include phenyl-[m-(2-hydroxytetradecyclo)phenyl] iodonium hexafluoroantimonate and diphenyliodonium tetrakis(pentafluorophenyl)borate. The amount of the photopolymerization initiator is preferably 0.1 to 5 wt % based on the total weight of the liquid composition.

The above liquid composition is set between and in contact with the surface of the substrate and the surface of the mold in the form of a film, at least one of heat and ultraviolet radiation is applied to the composition set in the form of a film, the mold is removed, and the composition is heated as required to form an article having a predetermined surface configuration, such as an optical element in which the surface of the substrate is covered with a film having a surface configuration which is the inversion of the surface configuration of the mold. The following two processes are typically used to form the article.

In the first process (to be referred to as "mold casting process" hereinafter), the liquid composition is poured over a mold, degasified and assembled with a substrate, at least one of heat and ultraviolet radiation is applied to the assembly, the mold is removed, and the molded product is heated as required. That is, the mold having predetermined fine irregularities in the molding surface is kept horizontal with the molding surface facing up, and the liquid composition having a viscosity of 1 to 200 cSt is poured over the mold to fill depressions in the mold. In place of pouring, the mold may be immersed in a bath of the liquid composition, or the liquid composition may be applied to the molding surface of the mold with a brush. In this state, the liquid composition is maintained at room temperature to 100° C. under a reduced pressure of 2 to 5 Pa for 5 to 10 minutes in such a manner that air should not be contained in the liquid composition on the mold in order to remove bubbles or dissolved oxygen contained in the liquid.

Then, the substrate is contacted to the liquid on the mold in such a manner that a gap should not be formed between the liquid composition and the surface of the substrate in order to set the liquid composition between and in contact with the surface of the substrate and the molding surface of the mold in the form of a film, and the liquid composition is maintained at 20 to 100° C. for 1 to 30 minutes while it is exposed to ultraviolet radiation or heated at 140 to 250° C. for 10 to 120 minutes in that state to be polymerized and cured. In the case of exposure to ultraviolet radiation, at least one of the substrate and the mold is made from a material which transmits ultraviolet radiation. Subsequently, by stripping off and removing the mold, a film of a cured polydimethylsiloxane having irregularities in the surface which are the inversion of irregularities in the surface of the mold is formed in such a state that it is adhered to the surface of the substrate.

This film is finally heated at 180 to 350° C. under normal pressure or a reduced pressure of 2 to 5 Pa for 15 to 250 minutes as required to vaporize the residual initiator and unpolymerized product contained in the polysiloxane film with the result that the film is slightly shrunken in volume in a thickness direction to become a compact film. Thus, an article such as an optical element covered with a film having a surface configuration which is the inversion of the surface configuration of the mold is obtained.

In the second molding process (to be referred to as "substrate casting process" hereinafter), the liquid composition is directly poured over the surface of the substrate and degasified, the mold is pressed against the film on the surface of the substrate, the film is exposed to ultraviolet radiation or heated in this state, the surface configuration of the mold is transferred to the surface of the film, the mold is removed, and the film is finally heated as required. That is, the surface to be covered of the substrate is maintained horizontal and the liquid composition having a viscosity of 1 to 200 cSt is poured over the substrate and spread over the surface of the substrate in the form of a film to a predetermined thickness. In this state, the liquid composition is maintained at room temperature to 100° C. under a reduced pressure of 2 to 5 Pa for 5 to 10 minutes in such a manner that air should not be contained in the liquid composition filled on the substrate in order to remove bubbles and dissolved oxygen contained in the liquid. Then, the mold having predetermined fine irregularities in the surface is pressed against the liquid composition in the form of a film and kept at a pressure of 0.5 to 120 kg/cm$^2$ and a temperature of 160 to 350° C. for 60 seconds to 60 minutes or pressed against the liquid composition at the above pressure and kept at 20 to 100° C. for 60 seconds to 30 minutes while it is exposed to ultraviolet radiation at an irradiation intensity of 1.0 to 50 mW/cm$^2$ at an exposed site in this state to almost complete the polymerization reaction of the liquid composition in order to cure it. In the case of exposure to ultraviolet radiation, at least one of the substrate and the mold is made from a material which transmits ultraviolet radiation. Then, by stripping off and removing the mold, a polydimethylsiloxane film which is a cured film having irregularities in the surface which are the inversion of the irregularities of the mold is formed in such a state that it is adhered to the surface of the substrate. Then, the film is heated at 180 to 250° C. under normal pressure or a reduced pressure of 2 to 5 Pa for 15 to 350 minutes as required to vaporize the residual photopolymerization initiator and unpolymerized product contained in the polysiloxane film with the result that the film is slightly shrunken in volume in a thickness direction to become a compact film. An article such as an optical element covered with a film having a surface configuration which is the inversion of the surface configuration of the mold is obtained.

A release film made from gold (Au) is preferably formed on the molding surface of the mold used in the present invention. Since gold has excellent releasability for a sol-gel material, mechanical strength high enough to withstand pressure applied to the sol-gel material, heat resistance, corrosion resistance and oxidation resistance, it is excellent as a release film. When the thickness of the gold release film is too small, the number of times of re-use becomes small and when the thickness of the film is too large, mold transferability deteriorates. Therefore, the thickness of the release film is preferably 200 to 1,000 nm, more preferably 400 to 600 nm. Since the release film has higher releasability as its surface becomes smoother, it is preferably formed uniform and smooth by sputtering, vacuum deposition, electroless plating, electrolytic plating or hot foil stamping.

It is preferred to form an adhesion enhancing layer made from at least one metal selected from the group consisting of platinum (Pt), copper (Cu), palladium (Pd) and silver (Ag) under the gold (Au) release film, that is, between the surface of the mold substrate and the above release film. Specifically, a platinum (Pt), copper (Cu), palladium (Pd) or silver (Ag) layer or an alloy layer thereof is formed on the molding surface of the mold substrate to a predetermined thickness before a release film is formed on the surface. The adhesion enhancing layer adheres firmly the release film to the molding surface of the mold and serves as a protective layer for the formation of a pure release film by preventing the molding surface layer (for example, silicon) of the mold substrate from being mixed with the release film at the time of forming the release film. A metal which is excellent in adhesion to the molding surface of the mold substrate and the protection of the surface is platinum (Pt). When the thickness of the adhesion enhancing layer is too small, adhesion between the release film and the molding surface of the mold substrate cannot be increased and the release film is not made from pure gold. When the thickness is too large, the predetermined configuration of the molding surface of the mold substrate changes disadvantageously. Therefore, the adhesion enhancing layer has a thickness of preferably 50 to 400 nm, more preferably 100 to 200 nm. The adhesion enhancing layer is preferably formed uniform and smooth by sputtering, vacuum deposition, electroless plating or electrolytic plating.

At least the molding surface of the above mold substrate is made from at least one material selected from the group consisting of titanium (Ti), aluminum (Al), silicon (Si) and oxides thereof. The mold substrate may be made from titanium, aluminum, silicon, titanium oxide, aluminum oxide or silicon oxide, or may have a prime coat made from at least one material selected from the group consisting of titanium (Ti), aluminum (Al), silicon (Si) and oxides thereof on the surface (surface to be covered with a release film) of a core material of silicon, glass (including quartz glass), resin, metal or composite thereof. When the molding surface of the mold substrate is made from the above material, the release film and the adhesion enhancing layer firmly adhere to the mold substrate, whereby there is no possibility that the release film will peel off from the mold and durability improves. The prime coat has a thickness of preferably 20 to 300 nm, more preferably 50 to 100 nm. The prime coat is preferably formed uniform and smooth by sputtering, vacuum deposition, electroless plating or electrolytic plating. An example of the mold substrate is what is obtained by vacuum depositing titanium on a core member made from silicon or quartz glass.

A material having an expansion coefficient close to that of the release film is preferably selected as the material of the above core member. The core member made from a resin has advantages that it can be finely processed easily and can be easily molded into a desired form. A glass or metal core member has high heat resistance and mechanical strength and excellent durability.

The mold in the present invention has projections or depressions in its molding surface. The projections and depressions are, for example, spherical, conical, pyramid-like or slit-like having a desired section. Any number of spherical, conical or pyramid-like projections may be formed in the entire surface or part of the release film. When slits are formed as depressions, any number of linear or curved slits may be formed. When a plurality of slits are formed, they may be formed concentrically or in a lattice form.

The substrate in the present invention is shaped like a flat board or curved board. It is desired that the surface of the substrate have a warp (the length of thermal deformation in a direction perpendicular to the surface per the unit length in the surface direction of the substrate) at 200° C. and 20° C. of ±5 μm or less per 1 cm. When the warp is above this range, the film may peel off from the substrate or the film may crack in the film molding step. Therefore, it is preferred to select the material, size and shape of the substrate.

Preferably, this substrate has a linear expansion coefficient of $1.5 \times 10^{-5}$/° C. or less. When the linear expansion coefficient of the substrate is larger than $1.5 \times 10^{-5}$/° C., in the case of a plastic substrate having a high thermal expansion coefficient, such as polypropylene (9 to $15 \times 10^{-5}$/° C.), the film may peel off from the surface of the substrate or the film may crack in the step of molding an organopolysiloxane film. General inorganic glass has a linear expansion coefficient of $1.5 \times 10^{-5}/°$ C. or less. At least the surface of the substrate is preferably made from an oxide. If the surface in contact with the organopolysiloxane film of the substrate is not made from an oxide, the adhesion strength of the substrate will lower in the step of molding a film, whereby the film will readily peel off from the substrate. Preferred examples of the material of the substrate include oxide glasses such as silicate-based glass exemplified by float glass, borate-based glass and phosphate-based glass, quartz, ceramics, silicon, metals such as aluminum, epoxy resin and glass fiber reinforced polystyrene. Although the organopolysiloxane film does not adhere to a metal as it is, when the surface of a metal is treated with an oxidizing agent, it can be used as the substrate.

When a transparent object which transmits light having a desired wavelength, such as visible range, ultraviolet range or infrared range is used as the substrate in the present invention, the article obtained by the present invention can function as a transmission type optical element such as a lens array, diffraction grating (such as an echelette diffraction grating, echelon diffraction grating or echelle diffraction grating) or Fresnel lens. When a transparent or non-transparent object is used as the substrate, a reflection type optical element such as a diffraction grating, diffuser or Fresnel mirror, or other information recording medium such as CD-ROM can be obtained by forming a metal (such as aluminum or silver) or dielectric film (such as magnesium fluoride or titanium oxide) on the organopolysiloxane film.

When an inorganic substrate made from oxide glass such as silicate-based glass, borate-based glass or phosphate-based glass, quartz, ceramic, silicon or metal such as aluminum is used as the substrate in the present invention, it is desired that a film, preferably a 5 to 200 nm-thick film containing a silane coupling agent be formed by applying a surface treating composition containing a silane coupling agent to the surface of the substrate before use.

The silane coupling agent is, for example, a silicon compound having an organic functional group represented by the following formula (3):

$$R^4R^5_kSi(R^6)_{3-k} \tag{3}$$

wherein $R^4$ is an organic group having a methacryl group, acryl group, epoxy group, allyl group, mercapto group or amino group, or a vinyl group, $R^5$ is an alkyl group such as methyl group or ethyl group, $R^6$ is a group or atom having hydrolyzability, and k is 0 or 1. Examples of the above organic group having a methacryl group, acryl group, epoxy group, ally group, mercapto group or amino group include organic groups obtained by substituting the hydrogen of an alkyl group (such as alkyl group having 1 to 3 carbon atoms) by these groups. $R^6$ (group or atom having hydrolyzability) is an alkoxyl group, alkoxyalkoxyl group, acetoxyl group, amide group, oxime group, propenoxyl group or chlorine atom.

Illustrative examples of the silicon compound represented by the above formula (3) as the silane coupling agent are given below. They include acryl functional silanes, epoxy functional silanes, methacryl functional silanes, allyl functional silanes, mercapto functional silanes, amino functional silanes and vinyl functional silanes. The acryl functional silanes ($R^4$ in the above formula (3) is an organic group having an acryl group) include 3-acryloxypropyl trimethoxysilane, 3-acryloxypropylmethyl dimethoxysilane, 3-acryloxypropyl triethoxysilane and 3-acryloxypropylmethyl diethoxysilane. The epoxy functional silanes ($R^4$ in the above formula (3) is an organic group having an epoxy group) include 3-glycidoxypropyl trimethoxysilane, 2-(3,4-epoxycyclohexyl)ethyl trimethoxysilane and 2-(3,4-epoxycyclohexyl)ethyl triethoxysilane. The methacryl functional silanes ($R^4$ in the above formula (3) is an organic group having a methacryl group) include 3-methacryloxypropyl trimethoxysilane, 3-methacryloxypropyl triethoxysilane, 3-methacryloxypropylmethyl dimethoxysilane, 3-methacryloxypropylmethyl diethoxysilane, 3-methacryloxyundecyl trimethoxysilane and 3-methacryloxyethyloxypropyl trimethoxysilane. The allyl functional silanes ($R^4$ in the above formula (3) is an organic group having an ally group) include allyl triethoxysilane, allyl trichlorosilane, allyl trimethoxysilane and allylphenyl dichlorosilane. The mercapto functional silanes ($R^4$ in the above formula (3) is an organic group having a mercapto group) include 3-mercaptopropyl trimethoxysilane. The amino functional silanes ($R^4$ in the above formula (3) is an organic group having an amino group) include 3-aminopropyl trimethoxysilane. The vinyl functional silanes ($R^4$ in the above formula (3) is a vinyl group) include vinyl trimethoxysilane, vinyl triethoxysilane, vinyl tris ($\beta$-methoxyethoxy)silane, vinyl triacetoxysilane and vinyl trichlorosilane.

The surface treating composition may contain a compound represented by the following formula (4):

$$M(R^7)_p \tag{4}$$

wherein M is silicon, titanium, zirconium or aluminum, $R^7$ is a group or atom having hydrolyzability, and p is 4 when M is silicon, titanium or zirconium and 3 when M is aluminum, or a hydrolyzate thereof, besides the silane coupling agent.

Examples of $R^7$ (group or atom having hydrolyzability) include alkoxyl group, alkoxyalkoxyl group, acyloxy group, acetoxyl group and chlorine atom. By containing this compound, the film containing a silane coupling agent formed on the surface of the substrate is more firmly adhered to the surface of the substrate. When the content of the compound is too low, the effect of increasing this adhesion is small and when the content is too high, the effect of the silane coupling agent itself lowers. Therefore, the compound represented by the formula (4) (or its hydrolyzate) is preferably contained in the surface treating composition in an amount of 5 to 50 parts by weight based on 100 parts by weight of the silane coupling agent.

Out of the compounds represented by the above formula (4), compounds in which M is silicon include tetraethoxysilane, tetramethoxysilane, tetra-2-methoxyethoxysilane, tetraacetoxysilane and tetrachlorosilane.

Out of the compounds represented by the above formula (4), compounds in which M is titanium include tetramethoxy titanium, tetraethoxy titanium, tetraisopropoxy titanium, tetraisopropoxy titanium isopropanol complex, tetra-n-propoxy titanium, tetraisobutoxy titanium, tetra-n-butoxy titanium, tetra-sec-butoxy titanium, tetra-t-butoxy titanium, tetra(2-ethylhexyloxy)titanium and tetrastearyloxy titanium.

Out of the compounds represented by the above formula (4), compounds in which M is zirconium include tetramethoxy zirconium, tetraethoxy zirconium, tetraisopropoxy zirconium, tetra-n-propoxy zirconium, tetraisopropoxy zirconium-isopropanol complex, tetraisobutoxy zirconium, tetra-n-butoxy zirconium, tetra-sec-butoxy zirconium and tetra-t-butoxy zirconium.

Out of the compounds represented by the above formula (4), compounds in which M is aluminum include trimethoxy aluminum, triethoxy aluminum, triisopropoxy aluminum, tri-n-propoxy aluminum, triisobutoxy aluminum, tri-n-butoxy aluminum, tri-sec-butoxy aluminum and tri-t-butoxy aluminum.

The hydrolyzate of the compound represented by the above formula (4) include hydrolyzates obtained by substituting some or all of $R^7$'s in the above compound by a hydroxyl group and hydrolyzates obtained by the natural condensation of some of the substituted hydroxyl groups. These hydrolyzates can be easily obtained by hydrolyzing the compound in a mixed solvent of water and an alcohol in the presence of an acid.

The surface treating composition comprises an alcohol as an essential component and further an acid catalyst and water as optional components, in addition to the above silane coupling agent and optionally the compound represented by the above formula (4) (or a hydrolyzate thereof) to be contained.

The above acid catalyst is not always necessary when the above silane coupling agent and the compound represented by the above formula (4) are already hydrolyzed. However, when they are not hydrolyzed, the acid catalyst is preferably contained as a catalyst for the hydrolysis and dehydration of the above components. Although the type of the acid catalyst is not particularly limited, an acid catalyst which is easily vaporized by drying and hardly remains in the film is preferred because the film can be made hard. Examples of the acid catalyst include hydrochloric acid, nitric acid, acetic acid, hydrofluoric acid, formic acid and trifluoroacetic acid. The amount of the acid is preferably $10^{-5}$ to 10 parts by weight, more preferably $10^{-3}$ to 1 part by weight based on 100 parts by weight of the silane coupling agent.

The above water is not always necessary when the above silane coupling agent and the compound represented by the above formula (4) are already hydrolyzed. However, when they are not hydrolyzed, water is preferably contained in the surface treating composition for the hydrolysis of these components. The amount of water is 10 to 300 parts by weight based on 100 parts by weight of the silane coupling agent, including a water solvent for the compound represented by the above formula (4) and water contained in the alcohol to be described hereinafter as an impurity.

Although the above alcohol solvent is not particularly limited, it is, for example, methanol, ethanol, 1-propanol, 2-propanol, butyl alcohol or amyl alcohol. Out of these, chain saturated monohydric alcohols having 3 or less carbon atoms such as methanol, ethanol, 1-propanol and 2-propanol are preferred because their vaporization rates at normal temperature are high. The amount of the alcohol, which differs according to coating technique and desired film thickness, is preferably 500 to 10,000 parts by weight based on 100 parts by weight of the silane coupling agent.

The technique for applying the surface treating composition is not particularly limited. Dip coating, flow coating, curtain coating, spin coating, spray coating, bar coating, roll coating or brush coating may be used.

The surface treating composition is applied at a temperature of 0 to 40° C., for example, room temperature and a relative humidity of 40% or less. After application, the coating film is dried at a temperature of 0 to 40° C., for example, room temperature and a relative humidity of 40% or less for 10 seconds to 20 minutes. Subsequently, it may be heated at a temperature higher than room temperature to 30° C. for 30 seconds to 10 minutes as required.

The preferred composition of the surface treating composition based on the silicon compound represented by the above formula (3) is as follows.

Silicon compound represented by the formula (3): 100 parts by weight
Compound represented by the above formula (4): 5 to 50 parts by weight
Water: 10 to 300 parts by weight
Acid catalyst: $10^{-5}$ to 10 parts by weight
Solvent (alcohol): 500 to 10,000 parts by weight According to the present invention, an organopolysiloxane film having heat resistance high enough to stand a temperature of 350° C., a maximum thickness (thickness measured at a depression portion in the surface) of 1 μm to 1 mm, preferably 20 to 150 μm, a refractive index of 1.50 to 1.54 which is close to the refractive index of ordinary glass and fine surface irregularities, for example, those having a predetermined height of 5 to 500 μm and a predetermined width (pitch of irregularities) of 1 to 500 μm is formed on the substrate which is shaped like a flat board or curved board and whose surface has been treated with a silane coupling agent.

The dimethylpolysiloxane film which comprises this film contains 10 to 50 wt % of a methyl group, 1 to 30 wt % of a polymerized segment of a polymerizable organic group and 45 to 89 wt % of a Si—O structural segment. The total of the methyl group and the polymerized segment of the polymerizable organic group is 11 to 55 wt %.

This film is elastic (little brittle), has high strength and hardly cracks. Since bubbles formed by molding are not seen in the film and the shrinkage of the film at the time of molding is small, excellent transferability with extremely high dimensional accuracy of fine irregularities in the surface of the film can be achieved. Stated more specifically, when a large number of projections having a height of 20 to 100 μm, for example, are formed, height variations among the projections in the surface of the film are 1 μm or less. The deviation of the interval between projections in the surface of the film from that of the mold is measurement accuracy (0.2 μm) or less.

When the optical element of the present invention is used as a reflection type optical element, a reflection increasing film is preferably formed on the surface of the optical element. The reflection increasing film is a thin film of metal such as gold, silver, platinum or aluminum or a laminate formed by alternately piling up dielectric thin films having a high refractive index and a low refractive index. The dielectric thin film having a high refractive index is made from tantalum oxide, titanium oxide, zirconium oxide or hafnium oxide. Out of these, tantalum oxide stable to laser beams is preferably used. The dielectric thin film having a low refractive index is made from silica or magnesium fluoride. A combination of a metal thin film and a dielectric multi-layer film may be used. The refractive index and thickness of the thin film are adjusted such that the operation wavelength of the reflection type optical element and the wavelength of the reflection peak of the reflection increasing film agree with each other. When the optical element is used as a transmission type optical element, an anti-reflection film is preferably formed at the interface with air. The anti-reflection film is a laminate formed by alternately piling up dielectric thin films having a high refractive index and a low refractive index or an anti-reflection structure having a fine cyclic structure of 1 μm or less.

The coating film of the article having a predetermined surface configuration such as an optical element obtained by the present invention is made from a matrix containing silicon and oxygen, some of the above silicon atoms are bonded to other silicon atoms through a first polyhydrocarbon group having at least 4 carbon atoms (such as a group obtained by polymerizing two acryloxypropyl groups), and some of the above silicon atoms are directly bonded to a second monohydrocarbon group (methyl group). Since an organic segment and an inorganic segment are thus bonded together, a material for an optical element having excellent heat resistance and moldability is provided. By changing the contents of the first polyhydrocarbon group and the second monohydrocarbon group, the refractive index of the transmission type optical element can be adjusted. When the total content of the first polyhydrocarbon group and the second monohydrocarbon group is too high, they exert an influence upon heat resistance. Therefore, the total content is preferably 55 wt % or less.

The first polyhydrocarbon group combines the first silicon atom with the second silicon atom and may contain a hetero atom such as oxygen atom, nitrogen atom or sulfur atom in addition to carbon atom and hydrogen atom. The oxygen atom and nitrogen atom serve to increase the bonding force of the matrix and improve bonding force between the matrix and the surface of the substrate through chemical bonding such as ion bonding or hydrogen bonding. The second monohydrocarbon group may contain a hetero atom such as oxygen atom, nitrogen atom or sulfur atom in addition to carbon atom and hydrogen atom. It may also contain fluorine atom or another halogen atom. By using fluorine atom, the refractive index can be reduced and hydrophobic nature can be provided, thereby making it possible to improve the water resistance of the optical element.

EXAMPLES

Examples are provided to further illustrate the present invention.

The articles in Examples 1 to 6 were substantially produced by the following process: (1) preparation of a polydimethylsiloxane solution, (2) application of the solution to a mold or substrate and degasification, (3) assembly/exposure and mold release (assembly/heating and mold release in Example 6, and (4) final heating (baking).

The articles in Examples 7 to 13 were substantially produced by the following process: (1) preparation of a polydimethylsiloxane solution, (2) application of a surface treating composition comprising a silane coupling agent to an inorganic substrate, (3) application of the solution to a mold or substrate and degasification, (4) assembly/exposure and mold release, and (5) final heating (baking).

Preparation of Polydimethylsiloxane Solution A:

4 g of a polydimethylsiloxane having acryloxypropyl at both terminals (10 recurring units represented by —((CH$_3$)$_2$Si—O)—) and 0.04 g of a photopolymerization initiator, [2-hydroxy-2-methyl-1-phenylpropane-1-one], were fed to a brown sample bottle and stirred for 3 hours to prepare a stock solution A.

Preparation of Polydimethylsiloxane Solution B:

4 g of a polydimethylsiloxane having methacryloxypropyl at both terminals (10 recurring units represented by —((CH$_3$)$_2$Si—O)—) and 0.04 g of a photopolymerization initiator, [2-hydroxy-2-methyl-1-phenylpropane-1-one], were fed to a brown sample bottle and stirred for 3 hours to prepare a stock solution B.

Preparation of Polydimethylsiloxane Solution C:

4 g of a polydimethylsiloxane having methacryloxypropyl at both terminals (30 recurring units represented by —((CH$_3$)$_2$Si—O)—) and 0.04 g of a photopolymerization initiator, [2-hydroxy-2-methyl-1-phenylpropane-1-one], were fed to a brown sample bottle and stirred for 3 hours to prepare a stock solution C.

Preparation of Polydimethylsiloxane Solution D:

4 g of a copolymer of (epoxycyclohexylethyl)methylsiloxane which is a branched epoxysiloxane and dimethylsiloxane (120 recurring units represented by —((CH$_3$)$_2$Si—O)— and 5 (epoxycyclohexylethyl)methylsiloxane units) and 0.1 g of a 20 wt % isopropyl alcohol solution of a photopolymerization initiator [diphenyliodonium tetrakis(pentafluorophenyl)borate], were fed to a brown sample bottle and stirred for 3 hours to prepare a stock solution D.

Preparation of Silane Coupling Agent Solution E:

A mixture of 0.434 g of 3-acryloxypropyl trimethoxysilane and 0.868 g of HAS-10 (manufactured by Colcoat Co., Ltd., solid content of 10% (hydrolyzate of tetraethoxysilane)) was dissolved in a mixed solution of 8.598 g of ethanol and 0.0998 g of a nitric acid aqueous solution having a concentration of 0.22 mol/l and stirred for 3 hours to prepare a silane coupling agent solution E.

Preparation of Silane Coupling Agent Solution F:

A mixture of 0.541 g of 2-(3,4-epoxy)ethyl trimethoxysilane and 0.868 g of HAS-10 (manufactured by Colcoat Co., Ltd., solid content of 10% (hydrolyzate of tetraethoxysilane)) was dissolved in a mixed solution of 8.491 g of ethanol and 0.0998 g of a nitric acid aqueous solution having a concentration of 0.22 mol/l and stirred for 3 hours to prepare a silane coupling agent solution F.

Preparation of Silane Coupling Agent Solution G:

A mixture of 0.541 g of 2-(3,4-epoxy)ethyl trimethoxysilane and 0.087 g of tetraethoxysilane was dissolved in a mixed solution of 9.272 g of ethanol and 0.0998 g of a nitric acid aqueous solution having a concentration of 0.22 mol/l and stirred for 3 hours to prepare a silane coupling agent solution G.

Preparation of Silane Coupling Agent Solution H:

0.541 g of 2-(3,4-epoxy)ethyl trimethoxysilane was dissolved in a mixed solution of 9.272 g of ethanol and 0.0998 g of a nitric acid aqueous solution having a concentration of 0.22 mol/l and stirred for 3 hours to prepare a silane coupling agent solution G.

Application of a Solution to a Mold or Substrate and Degasification:

In the mold casting process, the above solution A was poured over the surface of a transparent mold to form a 50 μm to 1 mm-thick layer which was then degasified at room temperature under a reduced pressure of 3 to 5 Pa for 5 minutes. A photocurable film (viscosity: 180 cSt) could be formed on the mold or substrate by this degasification.

Assembly, Exposure and Mold Release:

In the case of the mold casting process, the coating film was then contacted to the surface of the substrate and exposed to ultraviolet radiation for 1 to 30 minutes in this state to be assembled with the substrate. In Example 6, the film was heated at 200° C. for 15 minutes in place of exposure to ultraviolet radiation. After the coating film was completely cured, the mold was stripped off and removed from the substrate. As a result, a board with fine irregularities in the surface having a film to which the surface configuration of the mold had been transferred and which was adhered to the surface of the substrate was obtained.

In the case of the substrate casting process, a transparent mold was pressed against the above coating film and exposed to ultraviolet radiation for 1 to 30 minutes to assemble the coating film with the substrate. Thereafter, the mold was removed. As a result, a board with fine irregularities in the surface having a film to which the surface configuration of the mold had been transferred and which was adhered to the surface of the substrate was obtained.

Final Heating:

The board having fine irregularities in the surface obtained by removing the mold was heated at 250° C. under a reduced pressure of 2 to 3 Pa for 60 minutes to obtain an article having an uneven surface. The performance and characteristic properties of the obtained article having an uneven surface were evaluated by the following methods.

Measurement of Height Variations Among Projections:

The measurement of height variations among the projections of the outermost layer was carried out by a laser microscope.

Measurement of Heat Resistance and Optical Properties:

After a heat resistance test was made on articles having an uneven surface obtained in Examples and Comparative Examples by maintaining them at 300° C. for 2 hours, they were returned to room temperature to check cracking in order to evaluate their heat resistances. Using an interference meter (He-Ne laser, $\lambda$=633 nm), the wave aberration of a diffraction grating, the spherical aberration of a microlens and the amount of reflection within the substrate at an incident angle of 6° upon the surface of the substrate were measured after and before the heat resistance test for evaluation. Also, the d-ray refractive index of the film portion was measured with an Abbe refractometer.

Adhesion Test:

The surface of the substrate having a film was cut with a knife to form 11 parallel cut lines in both longitudinal and transverse directions at intervals of 1 mm in order to form 100 squares and Cellophane adhesive tape was affixed to the substrate and stripped off. The number of squares adhered to the substrate and not removed was counted and expressed in percentage.

Chemical Resistance Test:

After the substrate having a film was immersed in an alkali solution for 1 hour, ethanol for 1 hour and boiling water for 1 hour, the film was observed with the naked eye to judge the separation of the film.

Preparation of Substrate 1:

A 50 mm-square quartz glass board having a thickness of 3.0 mm (linear expansion coefficient: $5.5 \times 10^{-7}$/° C.) was ultrasonically cleaned with an alkali and then with pure water to prepare a substrate 1.

Preparation of Substrate 2:

A 2.5 mm-square soda lime glass board having a thickness of 3.0 mm (linear expansion coefficient: $1.0 \times 10^{-5}$/° C.) was ultrasonically cleaned with an alkali and then with pure water to prepare a substrate 2.

Surface Treatment by Silane Coupling Agent Solution:

The silane coupling agent solution E or F was applied to the surface of the above substrates 1 and 2 by spin coating at a revolution of 1,500 rpm for 15 seconds and heated at 120° C. for 15 minutes. The thickness of each silane coupling agent coating was 100 nm. Surface treatments with the silane coupling agent solutions E, F, G and H are designated as surface treatments 1, 2, 3 and 4, respectively.

Example 1

A 50 mm-square quartz glass substrate having a thickness of 3.0 mm (linear expansion coefficient: $5.5 \times 10^{-7}$/° C.) as a glass substrate was ultrasonically cleaned with an alkali and then with pure water. Using the solution A, a film was formed on one side of this quartz glass substrate to form a board having fine irregularities in the surface in accordance with the mold casting method. A glass mold (50 mm×50 mm with a thickness of 5 mm) having about 2,500 depressions with a curvature radius of 1,750 $\mu$m, a lens diameter of 1,000 $\mu$m and a depression depth of 73 $\mu$m, consisting of 50 spherical depressions formed close to one another in a longitudinal direction and 50 spherical depressions formed close to one another in a transverse direction, was used as the mold. A 80 nm-thick titanium (Ti) film was formed as a prime layer on the surface of the mold to improve releasability and then a 170 nm-thick platinum (Pt) film was formed on the titanium film as a protective layer. Thereafter, this mold was placed in a vacuum sputtering device and a 53 nm-thick gold (Au) film was formed as a release film on the platinum film by sputtering to obtain a mold. After final heating, an organopolysiloxane film having a thickness of the most thin region of about 20 $\mu$m and a maximum thickness from the top of the spherical portion of 91.5 $\mu$m was formed on the quartz glass substrate and the above number of convex microlenses were formed in the surface of the film. The thickness of the coating of the solution A was about 100 $\mu$m, degasification was carried out gradually at room temperature for 5 minutes after coating, and the final pressure was 5 Pa. Exposure to ultraviolet radiation was carried out from the substrate side at an intensity of 10 mW/cm$^2$ and room temperature for 10 minutes and final heating was carried out at 3 Pa and 250° C. for 60 minutes.

The organopolysiloxane cured film formed as described above was transparent and had a refractive index of 1.48. A methyl group, an acryl polymerized segment [—(CH$_2$)$_3$OCO(CH$_2$)$_4$COO(CH$_2$)$_3$—] and Si—O structural segment were contained in the film in amounts of 32.7 wt %, 20.7 wt % and 46.6 wt %, respectively. The focusing distances of the microlenses ranged from 3,297 to 3,300 $\mu$m. As for the heights of the projections of the board having a film (board having fine irregularities in the surface), when 100 spherical projections selected at random were measured, the average height of the projections was 71.5 $\mu$m and its standard deviation was 0.12 $\mu$m. The shrinkage factor of the cured film calculated from these values was about 2%, the average spherical aberration measured by a He-Ne laser ($\lambda$=633 nm) of the microlenses was 0.05 $\lambda$ and its standard deviation was 0.001 $\lambda$. When the heat resistance of this board was evaluated, the film did not crack or peel off, and the focusing distances of all the projections ranged from 3,297 to 3,300 $\mu$m which was the same as before the heat resistance test. When the diameter of a convergent beam spot was measured by inputting parallel light vertically from the opposite side of the film, the diameters of the convergent beam spots of all the convex lenses were 3 $\mu$m or less which was the same as before the heat resistance test.

Comparative Example 1

When a board having fine irregularities in the surface was formed in the same manner as in Example 1 using the same substrate and mold as in Example 1 except that an acrylic acid monomer was used without a solvent in place of the solution A used in Example 1, the thickness of the most thin region of the film was about 35 $\mu$m. As for the heights of the projections of this board, when 100 spherical projections selected at random were measured, the average shrinkage factor was 6% which was larger than that of Example 1. Similarly, the average spherical aberration measured at 100 points was 0.3 $\lambda$ which was larger (6 times) than in Example 1 and its standard deviation was 0.01 $\lambda$ which was 10 times larger than in Example 1. Since the projections greatly differed from one another in height and were not spherical, the shape of the convergent beam spot was bad with a diameter of 10 $\mu$m. The focusing distances of the projections greatly varied from 2,900 to 3,600 $\mu$m. Further, when heat resistance was evaluated in the same manner as in Example 1, the film cracked or peeled off, the board greatly deformed, and the focusing distance and spherical aberration could not be evaluated.

Comparative Example 2

0.075 mol of phenyl triethoxysilane, 0.1 mol of dimethyl diethoxysilane and 0.063 mol of (3,3,3-trifluoropropyl) trimethoxysilane were placed in a beaker and stirred. 0.25 mol of ethanol was added to this solution and stirred, and an aqueous solution prepared by dissolving 0.1 wt % of formic acid in 1.75 mols (31.5 g) of water was further added to the resulting solution and stirred for 2 hours to prepare a solution. This solution was used in place of the solution A used in Example 1 to form a board having fine irregularities in the surface in the same manner as in Example 1. The thickness of the most thin region was about 50 $\mu$m. As for the heights of the projections of this board, when 100 spherical projections selected at random were measured, the average shrinkage factor was 10% which was larger than in Example 1. The average spherical aberration of the 100 projections was 0.75 $\lambda$ which was larger (15 times) than in Example 1 and its standard deviation was 0.15 $\lambda$ which was 15 times larger than in Example 1. Since the projections greatly differed from one another in height and were not spherical, the shape of the convergent beam spot was bad with a diameter of 12 $\mu$m. The focusing distance greatly varied from 3,000 to 3,500 $\mu$m but when the heat resistance was evaluated in the same manner as in Example 1, the film did not crack or peel off and the focusing distance and the spherical aberration remained the same as the values before the test.

Example 2

A 2.5 cm-square soda lime glass substrate having a thickness of 3.0 mm (linear expansion coefficient: 1.0×10$^{-5}$/° C.) was ultrasonically cleaned with an alkali and then with pure water as a glass substrate. Using the solution B, a film was formed on one side of this glass substrate to form a board having fine irregularities in the surface in accordance with the substrate casting process. A glass mold having 120 2.5 cm-long tub-like depressions with a substantially semi-circular arc section having a curvature radius of 100 $\mu$m and disposed close to one another in a longitudinal direction was coated with a release film as in Example 1. After final heating, an organopolysiloxane film having a thickness of the most thin region of about 30 $\mu$m and a maximum thickness from the top of the semi-circular portion of 130 $\mu$m was formed on the soda lime glass substrate and 120 columnar convex microlenses were formed in the surface of the film. The thickness of the coating film of the solution A was about 150 $\mu$m, degasification was carried out gradually at room temperature for 5 minutes after coating, and the final pressure was 5 Pa. Exposure to ultraviolet radiation was carried out from the substrate side at an intensity of 10 mW/cm$^2$ and room temperature for 10 minutes and final heating was carried out at 3 Pa and 250° C. for 60 minutes.

The organopolysiloxane cured film formed as described above was transparent and had a refractive index of 1.48. A methyl group, methacryl polymerized segment and Si—O structural segment were contained in the film in amounts of 32.0 wt %, 22.5 wt % and 45.5 wt %, respectively. As for the heights of the columnar projections of this substrate, when 20 projections selected at random were measured, the average height from the surface of the substrate was 130 $\mu$m and its standard deviation was 0.11 $\mu$m. When the heat resistance of this substrate was evaluated, the film did not crack and no change was seen in the appearance, projection height, its standard deviation and projection pitch of the film.

Example 3

A 2.5 cm-square soda lime glass substrate having a thickness of 3.0 mm (linear expansion coefficient: 1.0×10$^{-5}$/° C.) was ultrasonically cleaned with an alkali and then with pure water as a glass substrate. A 2.5 cm-square silicon reflection type echelon diffraction grating having an average thickness of 2.0 mm (about 1,000 irregularities (parallel linear projections) were formed in the surface of a silicon substrate by masking or etching, inclined surfaces on the both sides of each mountain portion agreed with the plane (1,1,1) of a silicon crystal, projection height of 20.15 $\mu$m, projection width of 14.3 $\mu$m, interval between adjacent gratings (interval between peaks) of about 24.7 $\mu$m, flat portion at the peak (length of the remaining unetched portion of about 5.0 $\mu$m)) was prepared as the mold. This mold was coated with the same release film as in Example 1. A board having fine irregularities in the surface which was a reflection type echelon diffraction grating having a thickness of the most thin region of about 40 $\mu$m was formed using the above substrate, mold and solution A in accordance with the mold casting process. The thickness of the coating of the solution A was about 150 $\mu$m, degasification was carried out gradually at room temperature for 5 minutes after coating, and the final pressure was 5 Pa. Exposure to ultraviolet radiation was carried out at an intensity of 10 mW/cm$^2$ and room temperature for 10 minutes and final heating was carried out at 3 Pa and 250° C. for 60 minutes.

The organopolysiloxane cured film formed as described above was transparent and had a refractive index of 1.48. As for the heights of the projections of this board having fine irregularities in the surface, when 10 linear projections selected at random were measured at 100 points at intervals of 9 mm in a longitudinal direction, the average height was 0.2 $\mu$m and its standard deviation was 0.05 $\mu$m. A reflection type echelon diffraction grating which was a board having fine irregularities in the surface capable of efficiently and selectively blazing 1.55 $\mu$m light and 1.30 $\mu$m light as diffracted light of 26-th order and diffracted light of 31-st order, respectively, was thus obtained. The average wave aberration measured by an He-Ne laser ($\lambda$=633 nm) of this reflection type echelon diffraction grating was 0.05 $\lambda$ and its standard deviation was 0.001 $\lambda$. When the heat resistance of this board having fine irregularities in the surface was evaluated, the film did not crack and no change was seen in the appearance, projection height, its standard deviation, diffraction pattern and wave aberration of the film from the values before the heat resistance test.

Example 4

A 2.5 cm-square soda lime glass substrate having a thickness of 3.0 mm (linear expansion coefficient: 1.0×10$^{-5}$/° C.) was ultrasonically cleaned with an alkali and then with pure water as a glass substrate. A 3.0 cm-square resin blazed diffraction grating having a thickness of 5 mm (pitch of 1.1 $\mu$m, groove depth of 0.8 $\mu$m, saw-toothed) was prepared as the mold. The surface of this diffraction grating was plated with Cr to a thickness of 80 nm in order to improve the releasability of the surface when it was used as the mold and then a 5 nm-thick Au layer was formed on the surface by sputtering. A board having fine irregularities in the surface which was a reflection type blazed diffraction grating having a thickness of the most thin region of about 3 $\mu$m was formed using the above substrate, mold and solution C in accordance with the mold casting process. The thickness of the coating of the solution C was about 150 $\mu$m, degasification was carried out gradually at room temperature for 5 minutes after coating, and the final pressure was 5 Pa. Exposure to ultraviolet radiation was carried out at an intensity of 10 mW/cm$^2$ and room temperature for 10 minutes and final heating was carried out at 3 Pa and 250° C. for 60 minutes.

The organopolysiloxane cured film formed as described above was transparent and had a refractive index of 1.48. A methyl group, methacryl polymerized segment and Si—O structural segment were contained in the film in amounts of 36.8 wt %, 9.8 wt % and 53.4 wt %, respectively. The thickness of each projection portion was 3.0 μm, the thickness of each depression portion was 2.2 μm and the refractive index was 1.48. As for the heights of the projections of this board having fine irregularities in the surface, when 10 linear projections selected at random were measured at 100 points at intervals of 9 mm in a longitudinal direction, the average height was 3.0 μm and its standard deviation was 0.05 μm. A reflection type blazed diffraction grating which was a board having fine irregularities in the surface capable of efficiently and selectively blazing the primary diffracted light of 1.55 μm light was thus obtained. The average wave aberration measured by a He-Ne laser ($\lambda$=633 nm) of this diffraction grating was 0.025 $\lambda$ and its standard deviation was 0.001 $\lambda$. When the heat resistance of this board having fine irregularities in the surface was evaluated, the film did not crack and no change was seen in the appearance, projection height, its standard deviation, diffraction pattern and wave aberration of the film from the values before the heat resistance test.

Example 5

A 2.5 cm-square soda lime glass substrate having a thickness of 3.0 mm (linear expansion coefficient: $1.0 \times 10^{-5}$/° C.) was ultrasonically cleaned with an alkali and then with pure water as a glass substrate. A board having fine irregularities in the surface which was a reflection type echelon diffraction grating having a thickness of the most thin region of about 40 μm was formed using the same mold having a release coat as in Example 3, the above substrate and solution D in accordance with the mold casting process. The thickness of the coating of the solution D was about 150 μm, degasification was carried out gradually at room temperature for 5 minutes after coating, and the final pressure was 5 Pa. Exposure to ultraviolet radiation was carried out at an intensity of 10 mW/cm² and room temperature for 10 minutes and final heating was carried out at 3 Pa and 250° C. for 60 minutes.

The organopolysiloxane cured film of the board having fine irregularities in the surface manufactured as described above was transparent and had a refractive index of 1.46. As for the heights of the projections of this board, when 10 linear projections selected at random were measured at 100 points at intervals of 9 mm in a longitudinal direction, the average height was 20.2 μm and its standard deviation was 0.05 μm. A reflection type echelon diffraction grating which was a board having fine irregularities in the surface capable of efficiently and selectively blazing 1.55 μm light and 1.30 μm light as diffracted light of 26-th order and diffracted light of 31-st order, respectively, was thus obtained. The average wave aberration measured by a He-Ne laser ($\lambda$=633 nm) of this reflection type echelon diffraction grating was 0.05 $\lambda$ and its standard deviation was 0.001 $\lambda$. When the heat resistance of this board having fine irregularities in the surface was evaluated, the film did not crack and no change was seen in the appearance, projection height, its standard deviation, diffraction pattern and wave aberration of the film from the values before the heat resistance test.

Example 6

A 2.5 cm-square soda lime glass substrate having a thickness of 3.0 mm (linear expansion coefficient: $1.0 \times 10^{-5}$/° C.) was ultrasonically cleaned with an alkali and then with pure water as a glass substrate. A board having fine irregularities in the surface which was a reflection type echelon diffraction grating having a thickness of the most thin region of about 40 μm was formed using the same mold having a release coat as in Example 3, the above substrate and solution D in accordance with the mold casting process. The thickness of the coating of the solution D was about 150 μm, degasification was carried out gradually at room temperature for 5 minutes after coating, and the final pressure was 5 Pa. After the coating was heated at 200° C. under a pressure of 15 kg/cm² for 15 minutes and then cooled to room temperature over 10 minutes, pressurization was stopped and the mold was removed. Final heating was carried out at 3 Pa and 250° C. for 60 minutes.

The organopolysiloxane cured film of the board having fine irregularities in the surface manufactured as described above was transparent and had a refractive index of 1.46. As for the heights of the projections of this board, when 10 linear projections selected at random were measured at 100 points at intervals of 9 mm in a longitudinal direction, the average height was 20.2 μm and its standard deviation was 0.05 μm. A reflection type echelon diffraction grating which was a board having fine irregularities in the surface capable of efficiently and selectively blazing 1.55 μm light and 1.30 μm light as diffracted light of 26-th order and diffracted light of 31-st order, respectively, was thus obtained. The average wave aberration measured by a He-Ne laser ($\lambda$=633 nm) of this reflection type echelon diffraction grating was 0.05 $\lambda$ and its standard deviation was 0.001 $\lambda$. When the heat resistance of this board having fine irregularities in the surface was evaluated, the film did not crack and no change was seen in the appearance, projection height, its standard deviation, diffraction pattern and wave aberration of the film from the values before the heat resistance test.

Example 7

A board having fine irregularities in the surface was manufactured by forming a film on the surface of the substrate 1 subjected to the surface treatment 1 using the solution A in accordance with the mold casting process. A glass mold (50 mm×50 mm with a thickness of 5 mm) having about 2,500 spherical depressions with a curvature radius of 1,750 μm, a lens diameter of 1,000 μm and a depression depth of 73 μm, consisting of 50 depressions formed close to one another in a longitudinal direction and 50 depressions formed close to one another in a transverse direction, was used as the mold. A 80 nm-thick titanium (Ti) film was formed on the surface of the mold as a prime layer to improve releasability and then a 170 nm-thick platinum (Pt) film was formed on the titanium film as a protective layer. This mold was placed in a vacuum sputtering device to form a 53 nm-thick gold (Au) film as a release film on the platinum layer by sputtering to obtain a mold. After final heating, an organopolysiloxane film having a thickness of the most thin region of about 20 μm and a maximum thickness from the top of the spherical portion of 91.5 μm was formed on the surface treated substrate 1 and the above number of convex microlenses were formed in the surface of the film. The thickness of the coating of the solution A was about 100 μm, gasification was carried out gradually at room temperature for 5 minutes after coating, and the final pressure was 5 Pa. Exposure to ultraviolet radiation was carried out from the substrate side at an intensity of 10 mW/cm² and room temperature for 10 minutes and final heating was carried out at 3 Pa and 250° C. for 60 minutes.

The organopolysiloxane cured film formed as described above was transparent and had a refractive index of 1.48. A methyl group, acryl polymerized segment [—(CH$_2$)$_3$OCO(CH$_2$)$_4$COO(CH$_2$)$_3$—] and Si—O structural segment were contained in the film in amounts of 32.7 wt %, 20.7 wt % and 46.6 wt %, respectively. The focusing distances of the manufactured convex lenses (microlenses) ranged from 3,297 to 3,300 µm. As for the heights of the projections of this board having a film (board having fine irregularities in the surface), when 100 spherical projections selected at random were measured, the average height was 71.5 µm and its standard deviation was 0.12 µm. The shrinkage factor calculated from these of the cured film was about 2%, the average spherical aberration measured by a He-Ne laser (λ=633 nm) of the microlenses was 0.05 λ and its standard deviation was 0.001 λ. When the heat resistance of this board was evaluated, the film did not crack or peel off, the focusing distances of all the projections ranged from 3,297 to 3,300 µm which was the same as before the heat resistance test. When the diameter of a convergent beam spot was measured by inputting parallel light vertically from the opposite side of the film, the diameters of the convergent beam spots of all the convex lenses were 3 µm or less which was the same as before the heat resistance test.

In an adhesion test, the adhesion of the film was 100% which proved that the film had high adhesive force. In a chemical resistance test, the separation of the film was not observed.

Comparative Example 3

When a board having fine irregularities in the surface was manufactured using the same substrate 1 subjected to the surface treatment 1 and the same mold as in Example 7 in the same manner as in Example 7 except that an acrylic acid monomer was used without a solvent in place of the solution A, the thickness of the most thin region was about 35 µm. As for the heights of the projections of this board, when 100 spherical projections selected at random were measured, the average shrinkage factor was 6% which was larger than in Example 7. The average spherical aberration of the 100 projections was 0.3 λ which was larger (6 times) than in Example 7 and its standard deviation (variation) was 0.01 λ which was 10 times larger than in Example 7. Since the projections greatly differed from one another in height and were not spherical, the shape of the convergent beam spot was bad with a diameter of 10 µm. The focusing distances greatly varied from 2,900 to 3,600 µm. Further, when the heat resistance of the board was evaluated in the same manner as in Example 7, the film cracked, peeled off and greatly deformed. Therefore, the focusing distance and spherical aberration could not be evaluated.

Comparative Example 4

0.075 mol of phenyl triethoxysilane, 0.1 mol of dimethyl diethoxysilane and 0.063 mol of (3,3,3-trifluoropropyl)trimethoxysilane were placed in a beaker and stirred. 0.25 mol of ethanol was added to this solution and stirred, and further an aqueous solution prepared by dissolving 0.1 wt % of formic acid in 1.75 mols (31.5 g) of water was added to this and stirred for 2 hours to prepare a solution. When this solution was used in place of the solution A in Example 7 to form a board having fine irregularities in the surface in the same manner as in Example 7, the thickness of the most thin region was about 50 µm. As for the heights of the projections of this board, when 100 spherical projections selected at random were measured, the average shrinkage factor was 10% which was larger than in Example 7. The average spherical aberration of the 100 projections was 0.75 λ which was larger (15 times) than in Example 7 and its standard deviation (variation) was 0.15 λ which was 15 times larger than in Example 7. Since the projections greatly differed from one another in height and were not spherical, the shape of the convergent beam spot was bad with a diameter of 12 µm. The focusing distances greatly varied from 3,000 to 3,500 µm. Further, when the heat resistance of the board was evaluated in the same manner as in Example 7, the film did not crack or peel off and the focusing distance and spherical aberration remained the same as the values before the test.

Comparative Example 5

A board having fine irregularities in the surface was formed in the same manner as in Example 7 except that the substrate 1 not treated with a silane coupling agent was used in place of the substrate 1 subjected to the surface treatment 1 in Example 7. The focusing distances of the formed convex lenses (microlenses), and the projection height, spherical aberration and durability of this board having a film (board having fine irregularities in the surface) were the same as in Example 7. However, the adhesion of the film was 20% in an adhesion test which means that the adhesion force of the film was not high. In a chemical resistance test, 80% of the film peeled off.

Example 8

A board having fine irregularities in the surface was manufactured by forming a film on one side of the substrate 2 subjected to the surface treatment 1 using the solution B in accordance with the substrate casting process. A glass mold having 120 2.5 cm-long tub-like depressions having a substantially semi-circular arc section with a curvature radius of 100 µm arranged close to one another in a longitudinal direction to be coated with the same release film as in Example 7, was used as the mold. After final heating, an organopolysiloxane film having a thickness of the most thin region of about 30 µm and a maximum thickness from the top of the semi-circular portion of 130 µm was formed on the substrate 2 and 120 columnar convex microlenses were formed in the surface of the film. The thickness of the coating of the solution A was about 150 µm and degasification conditions after coating, ultraviolet light exposure conditions and final heating conditions were the same as in Example 7.

The organopolysiloxane cured film formed as described above was transparent and had a refractive index of 1.48. A methyl group, methacryl polymerized segment and Si—O structural segment were contained in the film in amounts of 32.0 wt %, 22.5 wt % and 45.5 wt %, respectively. As for the heights of the columnar projections of this substrate, when 20 projections selected at random were measured, the average height from the surface of the substrate was 130 µm and its standard deviation was 0.11 µm. When the heat resistance of the substrate was evaluated, the film did not crack and no change was seen in the appearance, projection height, its standard deviation and projection pitch of the film. In an adhesion test, the adhesion of the film was 100% which proved that the film had high adhesive force. In a chemical resistance test, the separation of the film was not observed.

Example 9

A board having fine irregularities in the surface was manufactured by forming a film on one side of the substrate 2 subjected to the surface treatment 3 using the solution B in accordance with the substrate casting process. The same mold having a release coat as in Example 8 was used as the mold. After final heating, an organopolysiloxane film having a thickness of the most thin region of about 30 μm and a maximum thickness from the top of the semi-circular portion of 130 μm was formed on the substrate 2 and 120 columnar convex microlenses were formed in the surface of the film. The thickness of the coating of the solution B was about 150 μm, degasification was carried out gradually at room temperature for 5 minutes after coating, and the final pressure was 5 Pa. The film was cured by heating the mold on a hot plate at 150° C. for 15 minutes to obtain a molded product. The final heating was carried out at 3 Pa and 250° C. for 60 minutes.

The organopolysiloxane cured film formed as described above was transparent and had a refractive index of 1.48. A methyl group, methacryl polymerized segment and Si—O structural segment were contained in the film in amounts of 32.0 wt %, 22.5 wt % and 45.5 wt %, respectively. As for the heights of the columnar projections of this substrate, when 20 projections selected at random were measured, the average height from the surface of the substrate was 130 μm and its standard deviation was 0.11 μm. When the heat resistance of this substrate was evaluated, the film did not crack and no change was seen in the appearance, projection height, its standard deviation and projection pitch of the film. In an adhesion test, the adhesion of the film was 100% which proved that the film had high adhesive force. In a chemical resistance test, the separation of the film was not observed.

Example 10

A board having fine irregularities in the surface was manufactured by forming a film on one side of the substrate. 1 subjected to the surface treatment 4 using the solution B in accordance with the substrate casting process. The same mold having a release coat as in Example 8 was used as the mold. After final heating, an organopolysiloxane film having a thickness of the most thin region of about 30 μm and a maximum thickness from the top of the semi-circular portion of 130 μm was formed on the substrate 2 and 120 columnar convex microlenses were formed in the surface of the film. The thickness of the coating of the solution B was about 150 μm, and degasification conditions after coating, ultraviolet exposure conditions and final heating conditions were the same as in Example 8.

The organopolysiloxane cured film formed as described above was transparent and had a refractive index of 1.48. A methyl group, methacryl polymerized segment and Si—O structural segment were contained in the film in amounts of 32.0 wt %, 22.5 wt % and 45.5 wt %, respectively. As for the heights of the columnar projections of this substrate, when 20 projections selected at random were measured, the average height from the surface of the substrate was 130 μm and its standard deviation was 0.11 μm. When the heat resistance of the substrate was evaluated, the film did not crack and no change was seen in the appearance, projection height, its standard deviation and projection pitch of the film. In an adhesion test, the adhesion of the film was 100% which proved that the film had high adhesive force. In a chemical resistance test, 5% of the film peeled off.

Example 11

A 2.5 cm-square silicon reflection type echelon diffraction grating having an average thickness of 2.0 mm (about 1,000 irregularities (parallel linear projections) were formed in the surface of a silicon substrate by masking or etching, inclined surfaces on the both sides of each mountain portion agreed with the plane (1,1,1) of a silicon crystal, projection height of 20.15 μm, projection width of 14.3 μm, interval between adjacent gratings (interval between peaks) of about 24.7 μm, flat portion at the peak (length of the remaining unetched portion of about 5.0 μm)) was prepared as the mold. This mold was coated with the same release film (three Ti, Pt and Au layers) as in Example 7. A board having fine irregularities in the surface which was a reflection type echelon diffraction grating having a thickness of the most thin region of about 40 μm was formed using the substrate 2 subjected to the surface treatment 1, the above mold and solution A in accordance with the mold casting process. The thickness of the coating of the solution A was about 150 μm, and gasification conditions after coating, ultraviolet exposure conditions and final heating conditions were the same as in Example 8.

The organopolysiloxane cured film formed as described above was transparent and had a refractive index of 1.48. As for the heights of the projections of this board having fine irregularities in the surface, when 10 linear projections selected at random were measured at 100 points at intervals of 9 mm in a longitudinal direction, the average height was 0.2 μm and its standard deviation was 0.05 μm. A reflection type echelon diffraction grating which was a board having fine irregularities in the surface capable of efficiently and selectively blazing 1.55 μm light and 1.30 μm light as diffracted light of 26-th order and diffracted light of 31-st order, respectively, was thus obtained. The average wave aberration measured by an He-Ne laser ($\lambda$=633 nm) of this reflection type echelon diffraction grating was 0.05 $\lambda$ and its standard deviation was 0.001 $\lambda$. When the heat resistance of this board was evaluated, the film did not crack and no change was seen in the appearance, projection height, its standard deviation, diffraction pattern and wave aberration of the film from the values before the heat resistance test. In an adhesion test, the adhesion of the film was 100% which proved that the film had high adhesive force. In a chemical resistance test, the separation of the film was not observed.

Example 12

A 3.0 cm-square resin blazed diffraction grating having a thickness of 5 mm (pitch of 1.1 μm, groove depth of 0.8 μm, saw-toothed) was prepared as the mold. The surface of this diffraction grating was plated with Cr to a thickness of 80 nm in order to improve the releasability of the surface when it was used as the mold and a 5 nm-thick Au layer was formed on the surface of the Cr layer by sputtering. A board having fine irregularities in the surface which was a reflection type blazed diffraction grating having a thickness of the most thin region of about 3 μm was formed using the substrate 2 subjected to the surface treatment 1, the above mold and solution C in accordance with the mold casting process. The thickness of the coating of the solution C was about 150 μm, degasification was carried out gradually at room temperature for 5 minutes after coating, and the final pressure was 5 Pa. Exposure to ultraviolet radiation was carried out at an intensity of 10 mW/cm$^2$ and room temperature for 10 minutes and final heating was carried out at 3 Pa and 250° C. for 60 minutes.

The organopolysiloxane cured film formed as described above was transparent and had a refractive index of 1.48. A methyl group, methacryl polymerized segment and Si—O structural segment were contained in the film in amounts of 36.8 wt %, 9.8 wt % and 53.4 wt %, respectively. The thickness of each projection portion was 3.0 μm, the thickness of each depression portion was 2.2 μm and the refractive index was 1.48. As for the heights of the projections of this board having fine irregularities in the surface, when 10 linear projections selected at random were measured at 100 points at intervals of 9 mm in a longitudinal direction, the average height was 3.0 μm and its standard deviation was 0.05 μm. A reflection type blazed diffraction grating which was a board having fine irregularities in the surface capable of efficiently and selectively blazing the primary diffracted light from 1.55 μm light was thus obtained. The average wave aberration measured by a He-Ne laser (λ=633 nm) of this diffraction grating was 0.025 λ and its standard deviation was 0.001 λ. When the heat resistance of this board was evaluated, the film did not crack and no change was seen in the appearance, projection height, its standard deviation, diffraction pattern and wave aberration of the film from the values before the heat resistance test. In an adhesion test, the adhesion of the film was 100% which proved that the film had high adhesive force. In a chemical resistance test, the separation of the film was not observed.

Example 13

A board having fine irregularities in the surface which was a reflection type echelon diffraction grating having a thickness of the most thin region of about 40 μm was formed using the same mold having a release coat as in Example 11, the substrate 2 subjected to the surface treatment 2 and the solution D in accordance with the mold casting process. The thickness of the coating of the solution D was about 150 μm, and gasification conditions after coating, ultraviolet exposure conditions and final heating conditions were the same as in Example 12.

The organopolysiloxane cured film of the board having fine irregularities in the surface manufactured as described above was transparent and had a refractive index of 1.46. As for the heights of the projections of this board having fine irregularities in the surface, when 10 linear projections selected at random were measured at 100 points at intervals of 9 mm in a longitudinal direction, the average height was 20.2 μm and its standard deviation was 0.05 μm. A reflection type blazed diffraction grating which was a board having fine irregularities in the surface capable of efficiently and selectively blazing 1.55 μm light and 1.30 μm light as diffracted light of 26-th order and diffracted light of 31-st order, respectively, was thus obtained. The average wave aberration measured by a He-Ne laser (λ=633 nm) of this reflection type echelon diffraction grating was 0.05 λ and its standard deviation was 0.001 λ. When the heat resistance of this board was evaluated, the film did not crack and no change was seen in the appearance, projection height, its standard deviation, diffraction pattern and wave aberration of the film from the values before the heat resistance test. In an adhesion test, the adhesion of the film was 100% which proved that the film had high adhesive force. In a chemical resistance test, the separation of the film was not observed.

What is claimed is:

1. A process for producing an article having a predetermined surface configuration, comprising the steps of:

setting a composition comprising a compound which contains a dimethylsiloxane skeleton having at least three recurring units and at least one polymerizable organic group in the molecule between and in contact with the surface of a substrate and the molding surface of a mold in the form of a film, said substrate being an inorganic substrate having a surface coated with a surface treating composition which comprises a silicon compound represented by the following formula (3), as a silane coupling agent:

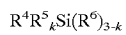

$$R^4R^5_kSi(R^6)_{3-k} \quad (3)$$

wherein $R^4$ is an organic group having a methacryl group, acryl group, epoxy group, allyl group, mercapto group, amino group, or a vinyl group, $R^5$ is an alkyl group, $R^6$ is a group or atom having hydrolyzability, and k is 0 or 1, or a hydrolyzate thereof, and a compound represented by the following formula (4):

$$M(R^7)_p \quad (4)$$

wherein M is silicon, titanium, zirconium or aluminum, $R^7$ is a group or atom having hydrolyzability, and p is 4 when M is silicon, titanium or zirconium and 3 when M is aluminum, or a hydrolyzate thereof;

applying at least one of heat and ultraviolet radiation to the composition in the form of a film;

removing the mold and, as required, heating the film; and forming the article in which the surface of the substrate is covered with a film having a surface configuration which is the inversion of the surface configuration of the mold.

2. The process of claim 1, wherein the composition further comprises a photopolymerization initiator, at least one of the substrate and the mold is made from a material which can transmit ultraviolet radiation, and the ultraviolet radiation is applied to the composition in the form of a film through the substrate or the mold made from the material which can transmit the ultraviolet radiation.

3. The process of claim 1, wherein the dimethylsiloxane skeleton of the compound is linear and the polymerizable organic group is located at both terminals of the dimethylsiloxane skeleton.

4. The process of claim 1, wherein the polymerizable organic group of the compound is at least one group selected from the group consisting of acryloxy group, methacryloxy group, vinyl group and epoxy group.

5. The process of claim 1, wherein the compound which contains a dimethysiloxane skeleton is represented by the following formula (1):

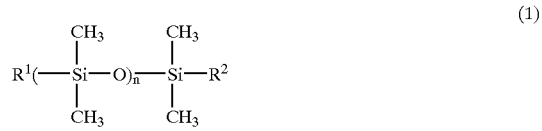

wherein $R^1$ and $R^2$ are each independently a vinyl group or a group having an acryloxy group, methacryl group or epoxy group, and n is an integer of 3 to 200.

6. The process of claim 1, wherein the compound which contains a dimethysiloxane skeleton is represented by the following formula (2):

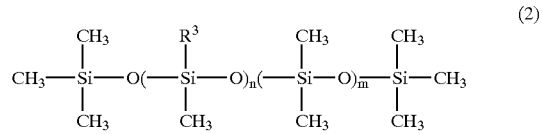

wherein $R^3$ is a vinyl group or a group having an acryloxy group, methacryloxy group or epoxy group, m is an integer of 2 to 200, and n is an integer of 1 to 50 when $R^3$ is a group having an epoxy group and an integer of 2 to 50 when $R^3$ is another group, with the proviso that m+n is 3 to 200.

7. The process of claim 1, wherein the substrate is made from at least one selected from the group consisting of glass, ceramic, metal and resin.

8. The process of claim 1, wherein the surface treating composition contains the compound represented by the formula (4) or a hydrolyzate thereof in an amount of 5 to 50 parts by weight based on 100 parts by weight of the silane coupling agent represented by the formula (3).

9. The process of claim 1, wherein the inorganic substrate has a film containing the above silane coupling agent and having a thickness of 5 to 200 nm on the surface.

10. The process of claim 1, wherein the article having a predetermined surface configuration is a reflection type diffraction grating, transmission type diffraction grating, microlens array or Fresnel lens.

* * * * *